United States Patent [19]

Palmos

[11] Patent Number: 5,754,223
[45] Date of Patent: May 19, 1998

[54] IMAGE SPEED CALIBRATING DEVICE

[76] Inventor: Mark Telemachus John Palmos, 11 Woolston Road, Westcliff, 2193 Johannesburg, Transvaal, South Africa

[21] Appl. No.: 191,159

[22] Filed: Feb. 3, 1994

Related U.S. Application Data

[63] Continuation-in-part of Ser. No. 15,082, Feb. 8, 1993, abandoned, which is a continuation of Ser. No. 792,985, Nov. 15, 1991, abandoned.

[30] Foreign Application Priority Data

Nov. 16, 1990 [ZA] South Africa ................... 90/9215

[51] Int. Cl.$^6$ ................................................. H04N 5/225
[52] U.S. Cl. ........................................... 348/207; 348/334
[58] Field of Search ..................................... 348/207, 211, 348/212, 213, 214, 218, 333; 352/170, 171; 126/213; 340/706, 709; H04N 5/30, 5/225

[56] References Cited

U.S. PATENT DOCUMENTS

| | | | |
|---|---|---|---|
| 3,212,099 | 10/1965 | Gasser | 352/171 |
| 3,908,077 | 9/1975 | Stut et al. | 348/141 |
| 3,950,611 | 4/1976 | Callis et al. | 348/171 |
| 4,761,640 | 8/1988 | Slavin | 340/709 |
| 4,794,459 | 12/1988 | Moberg et al. | 358/227 |
| 4,959,164 | 9/1990 | Engelmann et al. | 252/8.51 |
| 5,012,335 | 4/1991 | Cohodar | 358/108 |
| 5,068,735 | 11/1991 | Tuchiya et al. | 358/209 |

Primary Examiner—Andrew Faile
Assistant Examiner—Tuan V. Ho
Attorney, Agent, or Firm—Lawrence S. Cohen

[57] ABSTRACT

An image speed indicator displayed in a monitor to be used as an aid during the filming process with a video camera and monitor or a film camera being used with a video assist unit. The indicator can be adjusted to move at a selected speed horizontally and/or at a selected speed vertically. When both horizontal and vertical non-zero speeds are set the marker will move at an angle across the monitor. The apparatus displays and saves the speed setting so that it can be reproduced at later time Therefore shots recorded at different times can be shot with the marker set on a desired scene object and the camera panned at the same speed and angle or wholly horizontally or vertically.

21 Claims, 4 Drawing Sheets

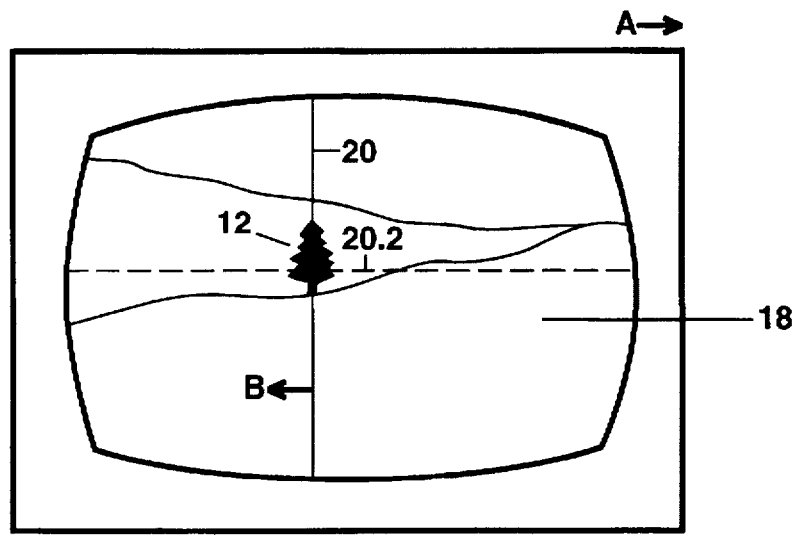
FIGURE #2
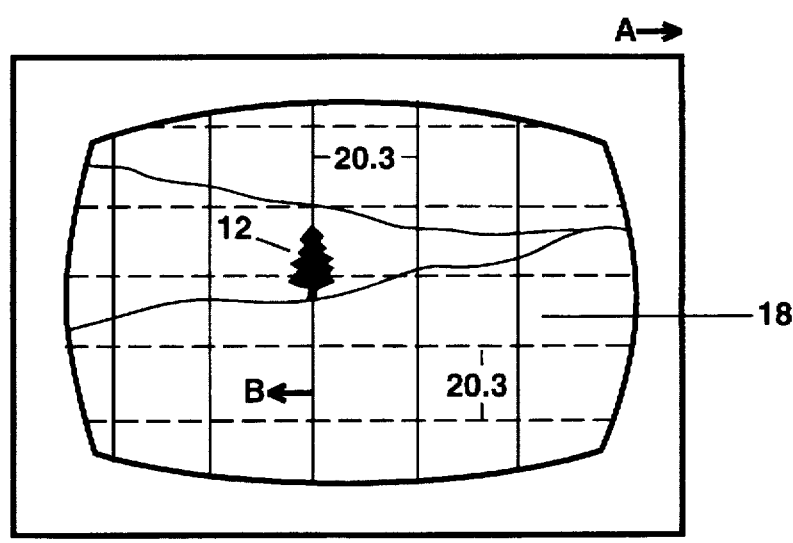
FIGURE #3

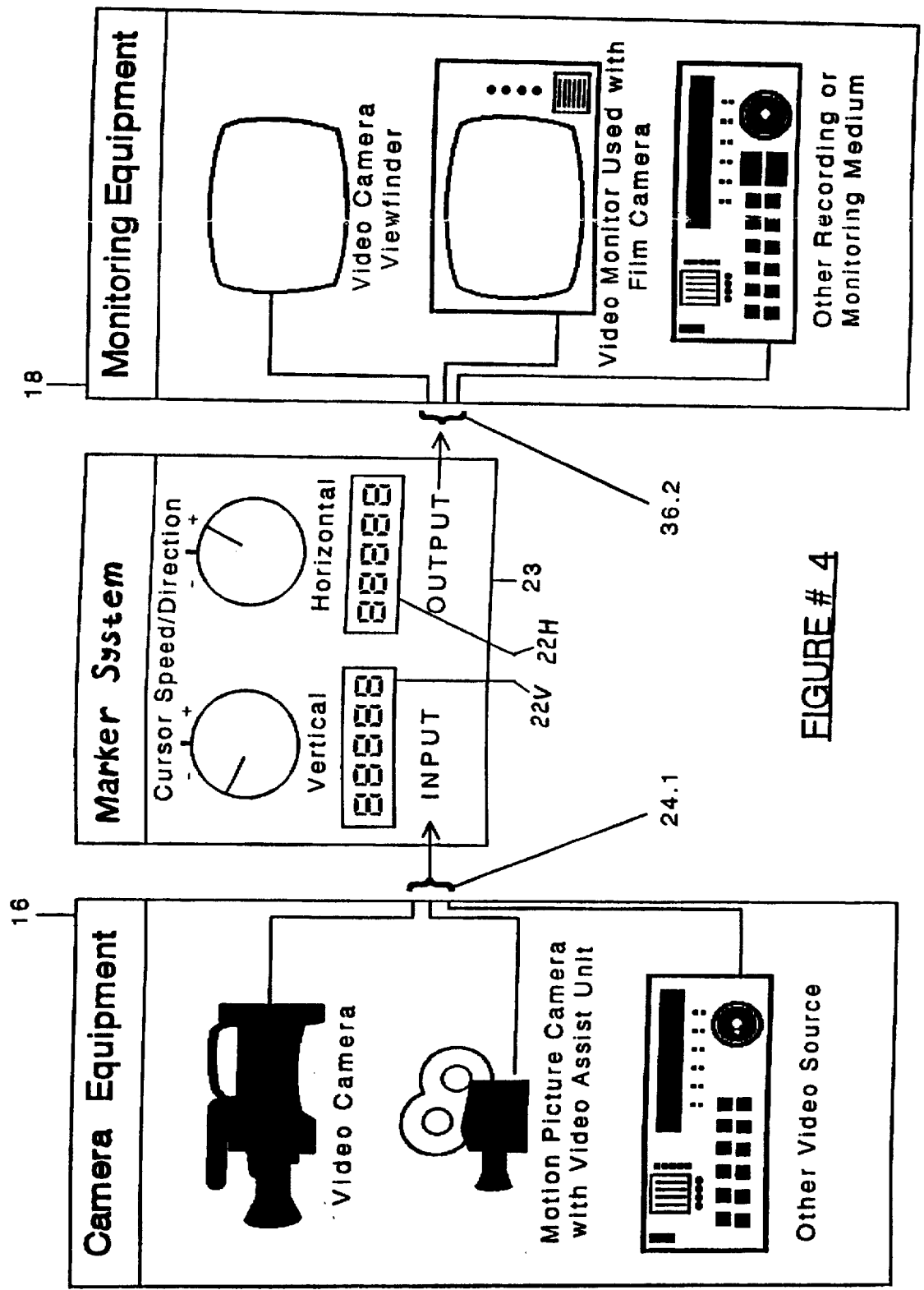

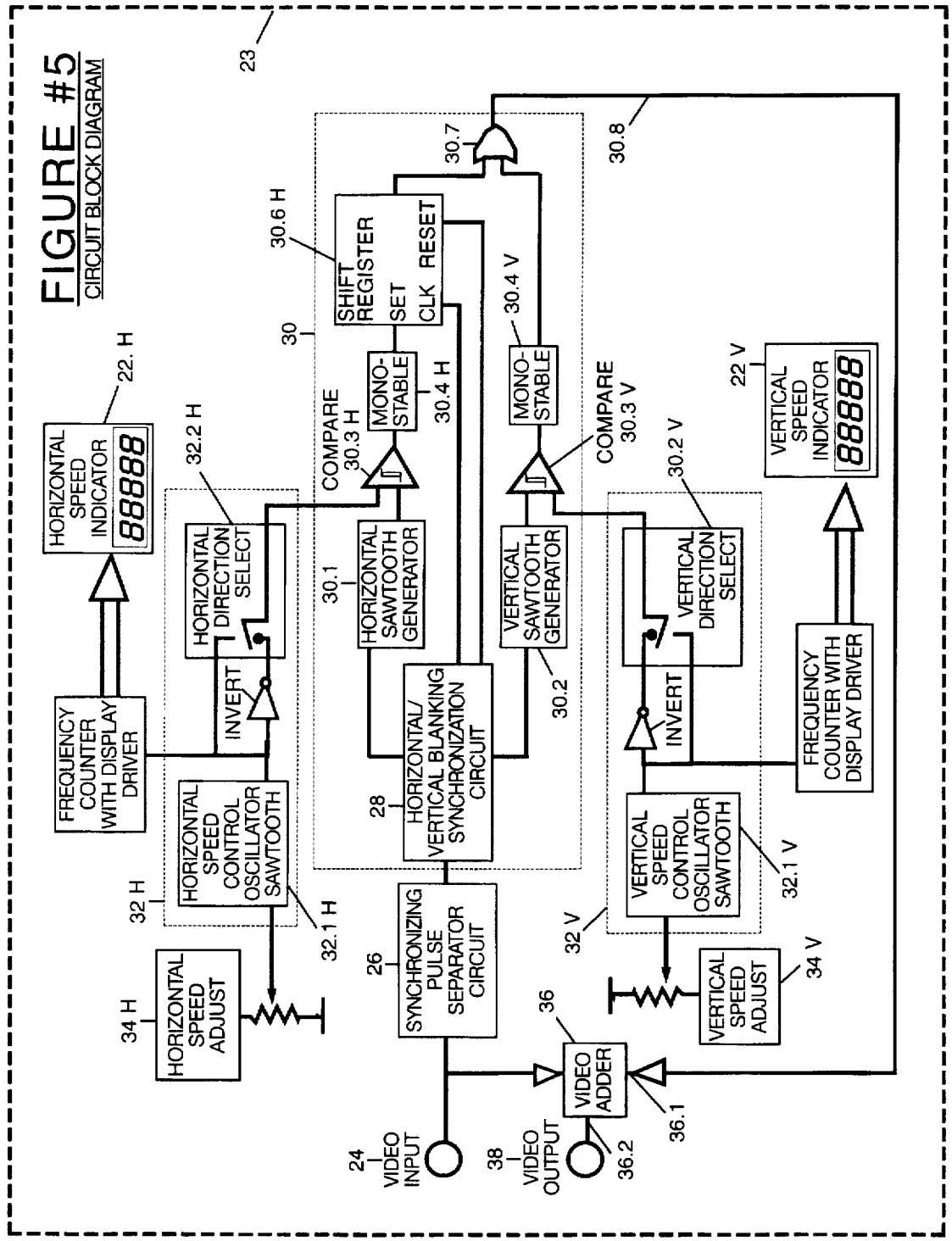

IMAGE SPEED CALIBRATING DEVICE

This application is continuation-in-part of application Ser. No. 08/015,082 filed on Feb. 8, 1993, which is a continuation of application Ser. No. 07/792,895 filed on Nov. 15, 1991, both abandoned, the contents of which are incorporated herein by reference.

INTRODUCTION AND BACKGROUND

This invention is an accessory for a camera, and more particularly it relates to an accessory for use with CAMERA EQUIPMENT which consists of video cameras or "video assist" units used with film cameras. The term MONITORING EQUIPMENT as used herein is a generic term for any device which monitors a video signal or allows the image being filmed to be displayed. This includes the viewfinder of the video camera and the video monitor which accompanies a film camera being used with a video assist unit.

Often during the process of film making, a director films two or more separate moving shots in such a way that they appear to flow together smoothly when they are edited together sequentially, or that the apparent movement of the adjacent images seem to be continuous. In order to make movement seem continuous, the director needs to know how fast the image of the subject being filmed is moving relative to the monitoring equipment so as to be able to reproduce the same relative speed during subsequent filming.

Thus, a filmmaker may want to use the device while shooting two different shots, so that when they are eventually combined consecutively during the editing process, the edit point will give the effect of having a very smooth transition between the two separate shots.

Either the camera movement or the subject movement will create the impression of the image passing across the viewfinder/monitoring equipment. The speed at which the image of the subject moves across the viewfinder/monitoring equipment is call IMAGE SPEED. The term Image Speed is defined as: The speed of apparent relative motion between the monitoring equipment and the image of the action being filmed as observed on that monitoring equipment.

OBJECT OF THE INVENTION

It is an object of the invention to provide an arrangement which ensures that the image speed of a subject passing across the viewfinder/monitoring equipment during a subsequent shot is substantially the same as that of an image during the preceding shot.

SUMMARY OF THE INVENTION

According to the invention an Image Speed Indicator comprises a marker movable relative to the monitoring equipment used with the camera, means for causing the marker to move at any speed or angle relative to the monitoring equipment and means for providing an indication of the speed of the marker's movement relative to the monitoring equipment. The marker is electronically generated and displayed on the monitoring equipment.

The marker may be in the form of a vertical or horizontal line which, in use, is caused to move horizontally and/or vertically across the monitor. However, in a preferred embodiment the marker has a patterned or grid-shape configuration and may also be caused to move at a selected angle relative to the horizontal across the monitor.

The means for causing the marker to move relative to the monitoring equipment may be adapted to cause it to move at any selected, predetermined speed relative to the monitor.

The means for causing the marker to move relative to the monitoring equipment monitor preferably comprises control means for adjusting the speed of movement and/or the direction of movement.

The image speed indicator may be built into the camera, or alternatively may be a separate accessory, which is connectable to the camera and monitoring equipment.

BRIEF DESCRIPTION OF THE DRAWINGS

The invention will now further be described, by way of example only, with reference to the accompanying diagrams wherein:

FIG. 2: is a diagrammatic representation of a view on monitoring equipment/the viewfinder of the camera;

FIG. 3: is a diagrammatic representation of the same view through another viewfinder/monitoring equipment using a grid style marker;

FIG. 4: is a is a diagrammatic representation of the relationship between the Camera Equipment, the marker system and the monitoring equipment;

FIG. 5: is a detailed block diagram of electronic circuitry forming part of the invention and which provides the horizontal and vertical markers shown in FIG. 2, as well as the means for adjusting the marker speed and means for displaying that speed.

DESCRIPTION OF PRESENTLY PREFERRED EMBODIMENT OF THE INVENTION

Figure 1:
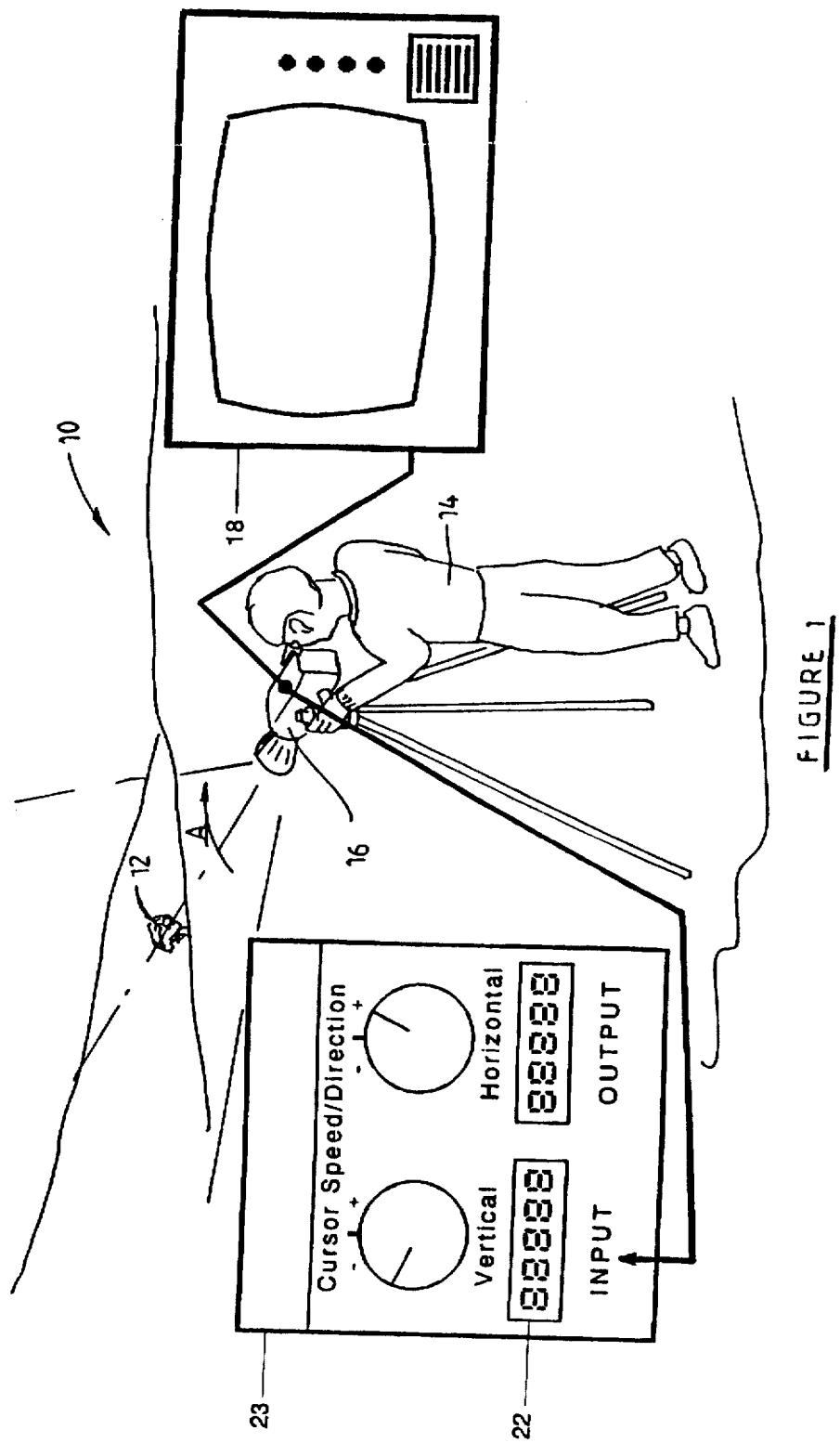
FIG. 1: is a diagrammatic representation of a camera man panning with his Camera Equipment past a landscape including a tree.

In FIG. 1, there is shown a landscape 10 including a tree 12. A camera man 14 is panning his video camera 16 past the landscape and past tree 12, in direction A. Monitoring equipment 18 and the Image Speed Indicator 23 are also shown attached to the camera.

In FIG. 2, there is shown an image of the landscape in the viewfinder/monitoring equipment 18 of the camera at a selected time during the panning movement. The Image Speed Indicator according to the invention comprises a marker in the form of a vertical marker line 20 and/or a horizontal marker line 20.2 which is shown superimposed and "cross-haired" on the image of the tree 12. In another embodiment of the invention, the marker may have a grid-like configuration, as shown at 20.3 in FIG. 3.

In FIG. 4, the Camera Equipment 16, outputs a video signal into the marker system 23 which comprises marker generation, marker control and display modules. Here the marker is added, and the speed at which is will be moving Vertically and/or Horizontally is selectively controlled and will be displayed on displays 22. The combined video signals are then output into the monitoring equipment 18. When the marker is moving both horizontally and vertically at the same time it will move at an angle across the viewfinder/monitoring equipment. The angle can be selected by selecting a horizontal and vertical speed. The selected horizontal speed and the selected vertical speed are each displayed on display 22.

As shown in FIG. 5, the marker system 23 further comprises a marker generation circuit 30 for generating the marker 20, circuits 32V and 32H for causing the marker 20 to move at a selected speed vertically and horizontally relative to the viewfinder/monitoring equipment 18 and displays 22V and 22H, for displaying the relative speed of the marker's movement vertically and horizontally and speed adjusters 34V and 34H for selectively adjusting the marker speed vertically and horizontally.

The marker system 23 comprises a video signal in put 24 connected to an input of a synchronizing pulse separator 26 for separating the periodic, negative going line and frame synchronizing pulses of the well known video signal format, from that part of the signal comprising the video information. The output of the separator 26 is connected to the marker generation circuit 30. The marker generation circuit 30 is also connected to circuits 32H an d 32V for causing movement of the marker relative to the viewfinder/ monitoring equipment 18. Control means 34V and 34H for selecting a desired marker speed are connected to the movement causing circuits 32V and 32H. The output of the marker generation circuit 30 is connected to the input 36.1 of an adder circuit 36 for adding the marker signal to the incoming video signal. The output 36.2 of the adder circuit is connected to a video output 38, which in turn is connected to viewfinder/monitoring equipment 18 to display the video signal as well as the generated marker 20 and 20.2 as shown in FIG. 2, or marker 20.3m as shown in FIG. 3.

In FIG. 5 there is shown a block diagram of electronic circuitry for generating the vertical marker 20 and/or the horizontal marker 20.2 as shown in FIG. 2.

The circuitry comprises a video input 24 connected to synchronizing pulse separator circuit 26. The output of the synchronizing pulse separator circuit 26 is connected to a blanking circuit 28. The output of the blanking circuit 28 is connected to a horizontal sawtooth generator 30.1 and to a vertical sawtooth generator 30.2.

The circuits 32V and 32H for causing movement of the markers 20 and 20.2 in the vertical and horizontal direction respectively, comprise variable frequency generators 32.1V and 32.1H respectively. The frequency of these generators is adjustable by a marker speed control means 34V and 34H respectively comprised of a variable resistor.

The marker generation circuit 30 further comprises two comparators 30.3H and 30.3V. The two inputs of comparators 30.3H are connected to the output of the horizontal sawtooth generator 30.1 and to the outputs of the horizontal direction control switch 32.2H. The two inputs of the other comparator 30.3V are connected to the output of the vertical sawtooth generator 30.2 and to the output of the vertical direction control switch 32.2V.

The output of comparator 30.3H is connected to the input of monostable circuit 30.4H. The output of comparator 30.3V is connected to the input of monostable circuit 30.4V. The output signal of monostable circuit 30.4H is fed to shift register 30.6H, at the SET input to set the shift register. The CLOCK and RESET inputs of the shift register 30.6 receive output signals from the blanking synchronization circuit 28.

The output signal of the shift register 30.6 is fed to the OR gate 30.7. The output signal of the monostable circuit 30.4V is fed to the OR gate 30.7. The OR gate 30.7 combines the vertical and horizontal input signals to provide a composite signal 30.8 which is then fed into the adder circuit 36.

Referring now to FIG. 1 and 2, in use, as the camera 16 is panned past the landscape in direction A, the image of the tree 12 will move across the viewfinder/monitoring equipment 18 in direction B. By causing the marker 20 to move relative to the viewfinder in direction B at a speed such that the tree and marker 20 remain superimposed on one another, as the camera is panned the speed of the image of the tree relative to the viewfinder/monitoring equipment will be indicated and may subsequently be reproduced. An indication of this relative speed is displayed on displays 22H and 22V showing the horizontal and vertical speeds. In other words, the tree is moving in the scene at the horizontal and vertical speeds registered on the displays 22H and 22V.

If a subsequent and similar panning shot needs to be taken, for example, the next day, the camera 16 is set up and the image speed as previously indicated is selected, by setting the speed adjuster 34V and 34H at the prior settings. During the subsequent shot, the camera 16 is panned such that the marker 20 and the image in the viewfinder/ monitoring equipment are moving at the same speed in the same direction. This will ensure that the image speeds of the two panning shots are substantially equal.

It will be appreciated that the speed of the image relative to the viewfinder/monitoring equipment during the two shots will appear identical even if different camera lenses are used for the two shots. Also, as can be appreciated, either the vertical speed or the horizontal speed could be set at zero in which case only the other speed setting will be operative and therefore the marker will move wholly in the direction, horizontally or vertically, for which a non-zero speed is set. If both a vertical and a horizontal speed is set, then the marker will move at an angle.

The diagram of FIG. 2 also shows a horizontally disposed marker 20.2 in broken lines. This marker is used in the same manner as marker 20, except that marker 20.2 moves vertically relative to the viewfinder/monitoring equipment 18, for purpose of indicating relative motion in the vertical direction.

The same principle will also apply to the marker 20.3 of the embodiment shown in FIG. 3. This marker is movable relative to the viewfinder/monitoring equipment 18 at a selected angle relative to the horizontal. This embodiment would be used when images pass diagonally or at another angle across the viewfinder 18.

It will be appreciated that there are many variations in detail on the Image Speed Indicator according to the invention without departing from the scope and spirit of the appended claims.

What is claimed is:

1. An image speed indicator for a camera comprising;
    an electronically generated marker movable relative to a monitor for use with a camera;
    means for causing the marker to move relative to the monitor at a selected speed and direction during a first operation of a camera;
    means for providing an indication of the selected speed and direction that takes place between the marker and the monitor; and
    means for causing a marker to move relative to a monitor at the selected speed and direction during operation of a camera, subsequent to said first operation of a camera.

2. An image speed indicator as claimed in claim 1 wherein the marker comprises a single horizontal marker line and/or a vertical marker line.

3. An image speed indicator as claimed in claim 1 wherein the marker has a patterned or grid-like configuration.

4. An image speed indicator as claimed in claim 1 wherein the means for causing the marker to move comprises an electronic circuit including means for adjusting the speed and direction of the movement of the marker.

5. An image speed indicator as claimed in claim 1 wherein the monitor is a viewfinder of a video camera or a video monitor used with a video assist unit and film camera.

6. An image speed indicator as claimed in claim 1 wherein the image speed indicator is integrated as part of a video camera or film camera to be used with a video assist unit.

7. An image speed indicator as claimed in claim 1 wherein the means for adjusting the speed of movement of the marker comprises a variable resistor.

8. An image speed indicator for a video camera system having a monitor which displays the scene being recorded by the camera comprising;
   means for electronically generating a selected marker configuration on the monitor;
   control means for setting movement of the marker in a selected line of movement and at a selected speed on the monitor;
   means for causing the marker to move across the monitor in the same selected line of movement and at the same selected speed during a first operation of a video camera system while recording a selected scene; and
   means for reproducing the movement of a marker across a monitor in the same selected line of movement and at the same selected speed during a second operation of a video camera system after said first operation of a video camera system.

9. The image speed indicator of claim 8 wherein the control means comprises a means for controlling the vertical speed of the marker on the monitor from a zero speed to a maximum speed and means for controlling the horizontal speed of the marker on the monitor from a zero speed to a maximum speed whereby wholly vertical movement or wholly horizontal movement or by a combination of vertical and horizontal movement an angled movement may be selected.

10. The image speed indicator of claim 9 wherein the marker comprises selectively a horizontal line element or a vertical line element or both a horizontal and vertical line element.

11. The image indicator of claim 9 wherein the marker comprises a grid of horizontal and vertical line elements.

12. A method of reproducing the relative movement of a recorded selected scene element comprising;
    at a first time electronically generating a marker on a video monitor connected to a camera, which video monitor displays the scene being recorded by the camera;
    providing means for moving the marker on the video monitor along a selected line of movement and at a selected speed;
    placing the marker on a selected scene element and while operating the camera moving the camera in coordination with movement of the marker on the monitor to keep the marker placed on the selected element;
    providing means for reproducing the marker line of movement and speed within a video monitor connected to a camera at a later time.

13. The method of claim 12 wherein the means for moving the marker on the video monitor includes means for moving the marker at an adjustably selected horizontal and at an adjustably selected vertical speed in each case from a zero speed to a maximum speed whereby vertical movement or horizontal movement or a combination resulting in an angled line of movement may be selected.

14. The method of claim 13 wherein the marker may be generated selectively as either horizontal line element and a vertical line element or both.

15. The method of claims 13 wherein the marker may be generated as a grid of horizontal and vertical line elements.

16. The method of claim 12 wherein the marker may be generated selectively as either horizontal line element and a vertical line element or both.

17. The method of claims 12 wherein the marker may be generated as a grid of horizontal and vertical line elements.

18. The method of claim 12 further comprising at a later second time causing the marker to move on a video monitor along the same line of movement as the first time and while operating a camera placing the marker on a selected scene element which may be the same or a different scene element as at the first time and moving the camera in coordination with movement of the marker on the monitor to keep the marker placed on the selected scene element.

19. The method of claim 18 further comprising combining the first and second scenes in a single video record.

20. The method of claim 19 wherein said combining is consecutive.

21. The method of claim 12 wherein the selected scene element of the second time is different from the selected scene element of the first time.

* * * * *